W. L. BLISS.
REGULATING MEANS FOR BATTERY CHARGING.
APPLICATION FILED APR. 29, 1911.
1,284,223.
Patented Nov. 12, 1918.
2 SHEETS—SHEET 2.
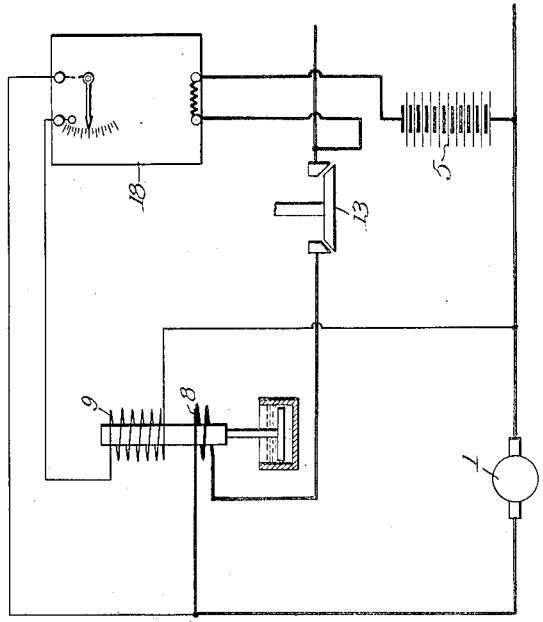
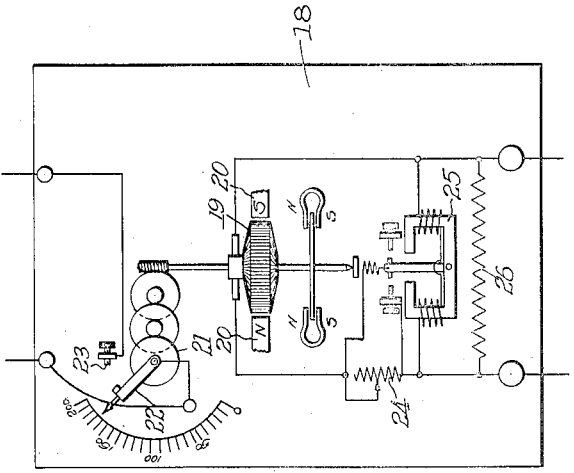
Witnesses:
Robert H. Weir
Geo. B. Jones
Inventor:
William L. Bliss
Edwin B. H. Tower Jr.
Atty.

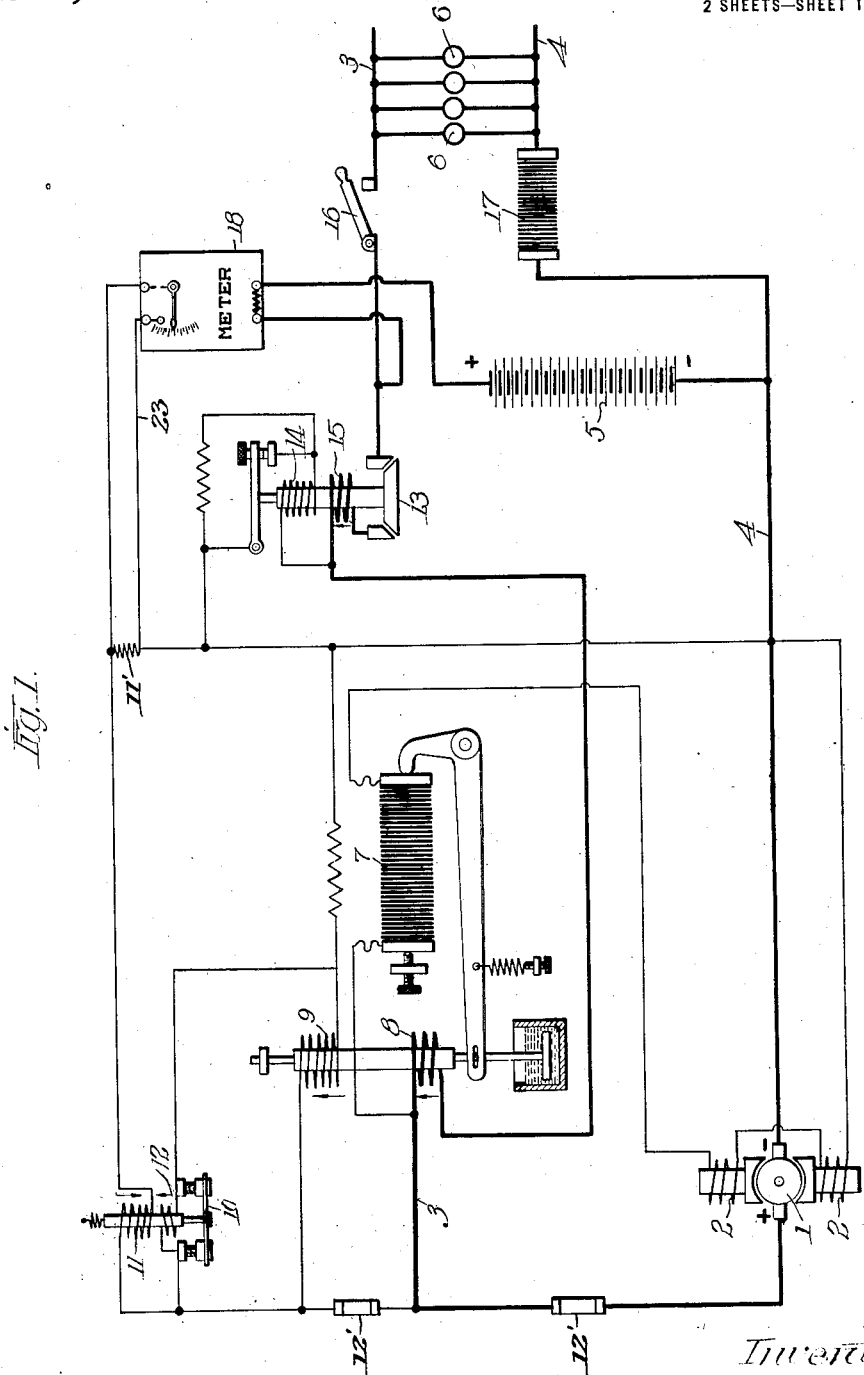

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

REGULATING MEANS FOR BATTERY-CHARGING.

1,284,223.

Specification of Letters Patent.

Patented Nov. 12, 1918.

Application filed April 29, 1911. Serial No. 624,111.

*To all whom it may concern:*

Be it known that I, WILLIAM L. BLISS, a citizen of the United States, residing at Niagara Falls, in the county of Niagara and State of New York, have invented new and useful Improvements in Regulating Means for Battery-Charging, of which the following is a full, clear, concise, and exact description, reference being had to the accompanying drawing, forming a part of this specification.

This invention relates to electric car lighting systems.

It is applicable also to other systems of electrical distribution in which a storage battery is to be charged.

Electric car lighting systems such as are now usually employed in practice, have a generator which is driven from a car axle and supplies current to a storage battery and lamps. When the generator runs at a low speed or is at rest, the storage battery furnishes the current to the lamps. An automatic switch is provided which connects the storage battery and lamps to the generator when the critical speed is reached, that is, when the speed is sufficient to cause the generator to produce a voltage which is approximately equal to the normal battery voltage. When the speed is below the critical point, the automatic switch opens so that the battery will not discharge through the generator. An automatic regulator is provided to regulate the generator so that the output thereof will remain within prescribed limits notwithstanding the variations in speed to which the generator is subjected. The usual regulator is electro-responsive and varies the field strength of the generator by means of resistance.

The generator should supply sufficient current during the time the automatic switch is closed to light the lamps and also to recharge the battery to compensate for the current which the battery furnishes to the lamps while the generator is inactive. The current taken from the battery and the time the generator is in operation vary from time to time. Accordingly, any regulator which is set so as to cause the generator to deliver a definite current to the battery fails to meet the actual requirements. The system should be capable of automatically adjusting itself to meet the varying conditions of service so that a proper charge will be maintained in the battery.

The problem has been to compensate fully for all current which may be taken from the battery.

An object of this invention is to provide means which will cause the generator to supply sufficient current to the battery to compensate for the discharge thereof and further to control the voltage applied to the battery when it is fully charged.

Another object is to provide means which will cause the generator to supply current to the battery until a definite charge is attained and will then reduce the generator voltage.

Another object is to provide improved means for varying the generator output in response to predetermined conditions of charge in the battery.

In accordance with this invention, as it is preferably carried out, an electro-responsive regulator is provided which regulates the generator to confine its output within prescribed limits throughout variations in speed while it is operating above the critical speed. A meter is employed to measure the input and output of the battery. This meter controls means which alters the standard of operation of the regulator when the battery is fully charged, so that the voltage of the generator will be maintained sufficient to supply the lamps without forcing an injurious overcharge into the battery. This voltage is that best adapted to the battery employed. In many systems this will be the battery floating voltage so that the battery is subjected neither to charge nor discharge. In some systems it may be desirable to so adjust the regulator as to permit a small current in a charging direction to flow into the battery. The character of regulation depends on the preadjustment of the regulator.

The battery output is measured by the meter as is also the battery input, and while the battery is being charged, the meter operates to cause more current to be delivered to the battery than was discharged, so as to restore fully the current that had been discharged and to compensate for battery losses.

The accompanying drawings illustrate a car lighting system embodying the invention.

The views of the drawing are as follows:—

Figure 1 is a diagram of the car lighting system.

Fig. 2 is a diagrammatic representation of the ampere hour meter.

Fig. 3 is a diagram of a modification of the system.

The car lighting system has a generator provided with an armature 1 and a shunt field winding 2. The generator supplies a main circuit 3, 4, across which the storage battery 5 and lamps 6 are connected in parallel branches.

The automatic switch 13 connects the battery and lamps to the generator when the generator voltage is substantially equal to the normal battery voltage. The lifting or closing coil 14 of the switch is connected across the generator terminals and when the predetermined voltage is attained, the coil closes the switch. A series coil 15 assists in holding the switch closed. If the generator voltage falls below the battery voltage, the battery will discharge through the series coil and by thus reversing its polarity, cause it to oppose the lifting coil and open the switch.

The generator is regulated by a variable pressure rheostat which is connected in series with the field winding. The resistance member of the rheostat is formed of a series of contacting electrodes of carbon or other suitable material, the resistance of which varies with variations in pressure exerted thereon. The rheostat is controlled by a series or current coil 8 and a shunt or voltage coil 9. These coils actuate a plunger which varies the pressure on the electrodes by means of a bell crank lever.

The current winding is in series with the battery and lamps and tends to keep the generator current constant, while the shunt winding is connected across the generator terminals and tends to keep the generator voltage constant.

The shunt winding is normally inert, it being short-circuited by a short-circuiting relay. The relay has a short-circuiting arm 10 normally impelled upward by a spring but adapted to open the short circuit upon the energization of the voltage responsive winding 11 connected across the generator terminals and responsive to the voltage of the latter. The coil 11 is normally connected across the system through a resistance 11'. The resistance is of sufficient value to prevent the coil 11 becoming effective at ordinary voltages across the system. Means are provided, under the control of the meter, as hereinafter explained, to short-circuit the resistance 11' under predetermined conditions and thereby to permit a sufficient current to flow through the coil 11 to render it effective.

An auxiliary coil 12 on the relay is connected across the relay contacts and hence is short-circuited when the relay short-circuits the coil 9. The coil 12 is wound to oppose the action of the winding 11, when the relay contacts are open. The short-circuiting arm 10 is adapted to vibrate rapidly, whereby the voltage responsive winding 9 is cut into and out of circuit for successive short intervals at a rapid rate. The effectiveness of the winding 9, therefore, is governed by the character of vibrations of the relay. Suitable fuses 12' are provided in the generator lead 3 and circuit of the shunt coils which operate the rheostat and relay.

The arrows adjacent the coils 8, 9, 11 and 12 indicate the direction of pull exerted by the coils on their respective cores.

Of course, other forms of rheostats may be substituted or different types of generator regulators employed to control the generator output.

An integrating meter 18 is connected in the battery circuit to measure the number of ampere hours supplied to the battery or discharged thereby. Suitable means are provided in connection with this meter for reducing the generator output when the battery has received a predetermined charge. the meter, shown more particularly in Fig. 2, has a motor provided with an armature 19 rotating in the field of a permanent magnet 20. This motor rotates one way or the other, depending on whether the battery is being charged or discharged. It drives a recording train of wheels 21, which operate a pointer 22 provided with a contact adapted to coöperate with the relatively fixed adjustable contact 23. The pointer indicates the state of charge of the battery on a suitably calibrated dial.

If the meter only measured the actual current put into the battery and that discharged thereby, it would not at all times accurately indicate the state of the battery charge. This is because of the internal and other battery losses. These are compensated for by causing the meter to run faster when measuring a battery discharge than when measuring a battery charge. The ratio between these speeds depends on the particular battery and is made proper to just compensate for the battery inefficiency. The change in rate is accomplished by a resistance 24 in the armature circuit of the meter motor. This resistance is preferably adjustable and is adapted to be short-circuited by the polarized relay 25. The resistance 26, in shunt to the motor armature, prevents full battery charging current from passing through the armature. The relay 25 opens the short circuit around the resistance 24 when the battery is being charged and closes the short circuit when the battery is being discharged, so that the motor rotates at a lower speed in charging than in discharging. The rate may be varied to suit the battery by adjusting the resistance 24.

Assume, to illustrate the operation of the meter, that the battery is a 200 ampere hour battery, that is, one which when fully charged will deliver a 200 ampere hour discharge, and that its internal and other losses are approximately 15%. Because of the 15% losses it will require approximately 235 ampere hours to completely charge the battery. When, therefore, approximately a 235 ampere hour charge has been supplied to the battery, the meter will indicate a full charge. When the battery has discharged 85% of its charge, that is, 200 ampere hours, it will be depleted. The meter is therefore adjusted so that when approximately a 235 ampere hour charge has been delivered, the meter will indicate 200 ampere hours and, upon the discharge of 200 ampere hours, it will indicate zero charge. Thus, at any instant, the meter accurately indicates the state of battery charge.

When the battery is fully charged, the meter closes the circuit at the contact 23, thereby short-circuiting the resistance 11' and causing an effective current to flow in the voltage coil 11 which is now connected directly across the system.

The lamp circuit may be controlled by a switch 16 and any suitable form of lamp regulator 17 may be employed to regulate the lamp voltage.

The operation of the system is as follows: When the generator is at rest, the automatic switch is open and the battery supplies any current required for the lamps. The regulator coils are deënergized so that the resistance of the field circuit is a minimum. Consequently, when the generator armature is rotated, the voltage will rapidly build up until it substantially equals the normal battery voltage. The automatic switch closes and the generator supplies the lamps and begins to charge the battery. When the generator current reaches a predetermined maximum, the current coil 8 will begin to insert resistance into the field circuit to cause this predetermined current to be maintained constant, regardless of further speed increases of the generator. A decrease in speed and consequent tendency to decrease in current will cause the coil to reduce the resistance in the field circuit and thus maintain the predetermined output.

The current flowing to the battery operates the meter and moves the pointer to indicate the ampere hours delivered to the battery. The contacts of the meter close the short circuit around resistance 11', and thus cause energization of the relay coil 11 when sufficient current has been measured by the meter to bring the battery to full charge. The coil 11 opens the relay contacts, thus causing energization of the voltage coil 9 of the regulator. The coil 12 is also energized to oppose the coil 11, when the relay opens. The coil 9 co-acts with the current coil 8 and immediately causes an increase in the resistance of the field circuit. The resultant drop in generator voltage reduces the force of the coil 11 and this, with the opposing force of the coil 12, instantly causes the coil 11 to release its core so that the relay contacts close and again short-circuit the coil 9. The operation is repeated and the relay arm 10 vibrates at a rapid rate. The effective energization of the voltage coil 9 is controlled by the character of the vibrations of the relay arm. The adjustment is such that the coil 9 is just sufficiently energized to reduce the generator voltage to any desired value and maintain it at this value, notwithstanding speed changes of the generator. In practice it is generally desirable to reduce the generator voltage sufficiently to cause the battery to float across the line, neither charging nor discharging. If desired, the voltage selected may be slightly above that of the battery at the instant the meter contacts are closed. The additional current supplied to the battery when it is substantially fully charged, will cause its counter electro-motive force to rise rapidly, with the result that a rapidly tapering charge will be delivered.

Should the generator speed fall below the critical point, the automatic switch opens and the battery supplies the lamps. The discharging current from the battery operates the meter in the reverse direction and at the faster rate to compensate for the battery losses. This opens the meter contacts and restores the regulator circuits to their former condition so that the battery will be recharged as soon as the generator becomes operative.

Fig. 3 illustrates a modification in which the meter contacts directly control the circuit of the coil 9. Otherwise, this system is the same as that illustrated in Fig. 1. As soon as the meter indicates a full charge, the coil 9 is fully energized and immediately reduces the generator voltage to the desired value and keeps it at this value. This causes an immediate reduction in the generator current sufficient to prevent current being supplied to the battery to overcharge it. In this figure many of the details have been omitted for the sake of clearness.

It is apparent that the generator regulator acts in response to the amount of battery charge actually received and is not dependent on the rising voltage of the system or some other characteristic of the battery.

The ampere hour meter may be employed with other systems than the specific embodiment chosen as an illustration and may be variously applied so as to vary the standard of operation of the generator, and thus reduce its output when a definite charge has been delivered to the battery.

The system and apparatus herein specifically set forth to explain the invention are, of course, susceptible of various modifications and changes, all of which will embody the invention and be within the appended claims.

What I claim is—

1. In combination, a variable source of supply, a storage battery to be charged thereby, means for measuring the charge and discharge of the battery, regulating means for said source, and means controlled by said measuring means for varying the standard of operation of said regulating means when a predetermined battery charge has been measured.

2. In an electrical system, a variable source of supply, a regulator for said source, a storage battery to be charged thereby, a load circuit to be supplied by said source or said battery, means for measuring the charge and discharge of said battery, and means controlled by said measuring means for varying the standard of operation of said regulator when a predetermined battery charge has been measured.

3. In a car lighting system, a generator, a storage battery to be charged thereby, a regulator for reducing the generator output when the battery is fully charged, and means in series with the battery for determining the point at which said regulator shall reduce the generator output.

4. An electrical system having a storage battery, regulating means to control the current supplied to the battery and the voltage applied thereto, and means connected in series with the battery for causing the regulating means to maintain a reduced voltage after a predetermined charge has been supplied to the battery.

5. In an electrical system, a storage battery, means for supplying current thereto, means for regulating the value of the current supplied to the battery, and means influenced by the product of the time and quantity of current supplied to the battery, and coöperating with said regulating means to cause said regulating means to reduce the value of the current after a predetermined quantity has been supplied to said battery.

6. In an electrical system of generation and regulation, a variable source of supply, a storage battery to be charged thereby, a regulator for maintaining a predetermined output from said source, means for measuring the current supplied to said battery or discharged thereby, and means under control of said measuring means whereby the output of said source may be maintained at a value above said predetermined output when less than a certain charge is in said battery.

7. In a system of electrical distribution, a variable speed generator, a storage battery to be charged thereby, a variable regulating means for controlling the generator output, means for operating the variable regulator, an integrating meter in the battery circuit for measuring the charge and discharge of the battery, and means controlled by the meter for varying the standard of operation of the variable regulator operating means when a predetermined battery charge is reached.

8. In combination, a variable speed generator, means for regulating the generator output, a storage battery to be charged by said generator, a meter in the battery circuit to measure the charge and discharge of said battery, and means controlled by the meter for varying the standard of operation of the regulating means when a predetermined battery charge has been measured by said meter.

9. In an electrical system, a storage battery, means for supplying current thereto, means for regulating the current supplied to the battery, means influenced by the amount of current supplied to the battery and coöperating in the operation of said regulating means to reduce the current after a predetermined amount has been supplied.

10. In an electrical system, a source of current having a predetermined normal output, a battery charged thereby, means for measuring the charging current and means controlled by said measuring means for causing said source to deliver current to the system at a reduced rate when a predetermined amount of charge has been delivered to the battery.

11. In combination, a variable speed generator having a predetermined normal output, a storage battery charged thereby, a meter for measuring the charge delivered to the battery, and means controlled by said meter for causing said generator to maintain a predetermined reduced output when a predetermined battery charge has been measured.

12. In an electrical system including a storage battery, a source of supply, means for regulating said source, means for measuring the current supplied to said battery by said source, said means also measuring the current discharged by said battery, said measuring means also affecting said regulating means when a predetermined battery charge has been measured, and means whereby said measuring means may permit more current to enter said battery than is discharged therefrom before affecting said regulating means, thereby compensating for battery losses.

13. In a battery charging system, means for measuring the current supplied to the battery, said means also measuring current discharged from the battery, means controlled by said means for regulating the battery charging current, and means controlled by the direction of current for causing a predetermined discharging current to influence said measuring means to a greater extent than the same amount of current in a charging direction.

14. In combination, a source of supply, a storage battery to be charged thereby, an adjustable regulator for said source whereby said battery may be charged according to a predetermined standard, a meter for measuring the charge supplied to said battery, and means under the control of said meter for altering said standard when the battery becomes fully charged, whereby the output from said source may be reduced to a desired amount according to preadjustment of said regulator.

15. In an electrical system, a battery intermittently discharging for varying periods, means for recharging said battery, means for regulating the recharging current, and means brought into operation only after a charge equal to the previous discharge plus an amount sufficient to compensate for battery losses has been supplied to the battery, said last mentioned means coöperating with said regulating means to vary the effect thereof on said charging current.

16. An electric regulator comprising a variable pressure rheostat adapted to be connected in series with a generator shunt field winding to regulate the generator output, a current responsive coil adapted to be connected in the external circuit of the generator for controlling said variable pressure rheostat, a voltage responsive coil adapted to be connected across the generator terminals and also adapted to control said variable pressure rheostat, and means for permitting the energization of said voltage responsive coil, said means including an integrating meter.

17. In a car lighting system, in combination, a generator having a shunt field, a main circuit for said generator, a storage battery connected across said main circuit, an integrating meter connected in series with said storage battery to measure the electrical energy supplied thereto, a regulating solenoid comprising a shunt coil and a series coil for controlling the generator output, said shunt coil being normally inert, whereby said generator is regulated for constant current by said series coil, and connections between said regulating means and said meter for permitting the energization of the shunt coil when the battery has received a certain predetermined charge.

18. In combination, a generator, a storage battery to be charged thereby, a regulator for the generator, an ampere hour meter in the battery circuit for measuring the charge and discharge of the battery, and means under the control of the ampere hour meter and associated with the generator regulator whereby when a predetermined charge has been given to the battery, the standard of field excitation of the generator is reduced so as to prevent further charging of the battery.

19. A generator, a storage battery, a generator regulator causing the generator to charge the battery at a suitable rate to a predetermined maximum value, means for measuring the quantity of current delivered to the battery, means for changing the character of operation of the generator regulator so that when a predetermined charge has been delivered to the battery the generator regulator will act to prevent further charge by causing the generator regulator to maintain a lower voltage on the battery, and means to prevent such action of the generator regulator until said predetermined measured charge has been delivered to the battery.

20. In a car lighting system, in combination, a generator having a shunt field, a main circuit for said generator, a storage battery connected across said main circuit, an integrating meter connected in series with said storage battery to measure the electrical energy supplied thereto, a regulating solenoid comprising a shunt coil and a series coil for controlling the generator output, said shunt coil being normally inert, whereby said generator is regulated for constant current by said series coil, and connections between said regulating means and said meter for permitting a gradual increase in the energization of said shunt coil whereby the energization of said series coil is decreased and the battery charging current tapered off.

21. In a car lighting system, in combination, a generator having a shunt field, a main circuit for said generator, a storage battery connected across said main circuit, an integrating meter connected in series with said storage battery to measure the electrical energy supplied thereto, a regulating solenoid comprising a shunt coil and a series coil for controlling the generator output, said shunt coil being normally inert, whereby said generator is regulated for constant current by said series coil, and connections between said regulating means and said meter for permitting a gradual increase in the energization of said shunt coil whereby the energization of said series coil is decreased and the battery charging current tapered off, said means including a vibrating contact arranged in a shunt circuit around said shunt coil.

22. In a car lighting system, in combination, a generator having a shunt field winding, a variable pressure rheostat connected in the shunt field circuit, an external circuit supplied by said generator, a storage battery and lamps connected in parallel branches across said external circuit, electro-magnetic means for controlling said variable pressure rheostat to maintain the generator current substantially constant during the charging of the battery, a meter connected in the battery circuit, a circuit-closer associated with said meter, and means coöperating with said electro-magnetic means adapted when energized by the operation of said circuit-closer to cause said rheostat to reduce the generator current and thereby reduce the battery charging current.

23. A car lighting system having a generator, a storage battery, lamps, an automatic electro-responsive regulator for regulating the generator to compensate for variations in speed and to maintain sufficient generator voltage when the generator is above critical speed to charge the battery, and means to measure the battery output and input and controlling the regulator so as to cause the generator to restore a definite number of ampere hours charge to the battery after a definite number of ampere hours discharge.

24. In a car lighting system, a variable speed generator, a storage battery to be charged thereby, means for measuring the current supplied to said battery or discharged thereby, a regulator for said generator, current responsive means for operating said regulator, and voltage responsive means also adapted to operate said regulator, one of said regulator operating means being under control of said measuring means, whereby the character of regulation is varied in accordance with the state of charge of said battery.

25. In a car lighting system, a variable speed generator, a storage battery to be charged thereby, means for measuring the current supplied to said battery or discharged thereby, a regulator for said generator, operating means for said regulator, and auxiliary means coöperating to affect the operation of said regulator, said auxiliary means being under control of said measuring means, whereby the character of regulation is varied in accordance with the state of charge of said battery.

26. In an electrical system of generation and regulation, a variable source of supply, a storage battery to be charged thereby, means for causing said source to deliver a certain output, said means also adapted to cause said source to deliver a different output, and means for measuring the current supplied to said battery or discharged thereby, said measuring means also operating to determine which of said outputs shall be delivered by said source depending on the state of charge of the battery.

27. In a car lighting system, a generator, a storage battery to be charged thereby, a regulator for controlling the generator output throughout the operation of the generator, electro-magnetic means including a current-responsive coil for operating said regulator, an ampere-hour meter in series between the generator and battery and responding to battery charging and discharging current, a normally ineffective modifying coil adapted when energized to modify the operation of said regulator, and means whereby the ampere hour meter, when a predetermined measured charge is in the battery, will cause an effective current to flow in said modifying coil, thereby causing said modifying coil to assist in said regulation when a predetermined state of charge of the battery has been reached.

28. In a system of electrical distribution, a variable speed generator, a regulator for controlling the generator output throughout the operation of the generator, operating means for the regulator, modifying means for the regulator operating means including a normally open-circuited coil adapted when energized to modify the generator regulation, and current-responsive means in series between the generator and battery adapted at times to complete the circuit for the coil of said modifying means to thereby cause said regulator to change the generator output.

In witness whereof, I have hereunto subscribed my name in the presence of two witnesses.

WILLIAM L. BLISS.

Witnesses:
CHARLES CHANDLER,
WM. A. TURBAYNE.